US011118836B2

(12) United States Patent
Pavlovskiy

(10) Patent No.: US 11,118,836 B2
(45) Date of Patent: Sep. 14, 2021

(54) REUSABLE AIR INJECTOR FOR DRYWALL

(71) Applicant: Alexander Pavlovskiy, Kent, WA (US)

(72) Inventor: Alexander Pavlovskiy, Kent, WA (US)

( * ) Notice: Subject to any disclaimer, the term of this patent is extended or adjusted under 35 U.S.C. 154(b) by 173 days.

(21) Appl. No.: 16/507,159

(22) Filed: Jul. 10, 2019

(65) Prior Publication Data

US 2021/0010258 A1    Jan. 14, 2021

(51) Int. Cl.
*F26B 21/00* (2006.01)
*E04B 1/70* (2006.01)
*F16L 5/00* (2006.01)

(52) U.S. Cl.
CPC .............. *F26B 21/004* (2013.01); *E04B 1/70* (2013.01); *F16L 5/00* (2013.01)

(58) Field of Classification Search
CPC .......... F26B 21/00; F26B 21/004; E04B 1/70; F16L 5/00; A01M 1/245; A01M 13/00; A01M 13/003; A01M 13/006; A01M 25/006
See application file for complete search history.

(56) References Cited

U.S. PATENT DOCUMENTS

| | | | | |
|---|---|---|---|---|
| 2,537,183 A | * | 1/1951 | Bloomer | F16L 5/06 285/210 |
| 4,448,447 A | * | 5/1984 | Funk | F16L 37/008 285/4 |
| 5,466,015 A | * | 11/1995 | Berenter | F16L 5/00 285/12 |
| 5,960,556 A | * | 10/1999 | Jansen | E04B 1/7092 34/402 |
| 6,406,068 B1 | * | 6/2002 | Bartholoma | F16L 5/14 285/208 |
| 6,647,639 B1 | * | 11/2003 | Storrer | F26B 21/00 34/104 |
| 6,840,004 B1 | * | 1/2005 | Allen | A01M 1/245 239/207 |
| 10,060,641 B2 | * | 8/2018 | Burton | F24F 7/025 |

OTHER PUBLICATIONS

Dri-Eaz Products, Inc., "Owners Manual Driforce InterAir Drying System", 1999.

* cited by examiner

*Primary Examiner* — Ryan A Reis
(74) *Attorney, Agent, or Firm* — Anthony Claiborne

(57) ABSTRACT

A reusable drywall air injector is fashioned from durable, rigid material. A pointed tip for piercing drywall extends from a hollow cylinder around which is disposed a helical blade. A hollow hex section is connected between the hollow cylinder and a hollow nipple, the interiors of the cylinder, the hex section and the nipple interconnecting to form a path for compressed air. Embodiments of the injector further fashion the interior of the hollow cylinder with notches adapted to receive a driver head. The injector is inserted into drywall by driving the injector by means of a motorized drill or screwdriver engaging the injector either by deep well socket around the hex section or, in embodiments, by appropriate driver head engaging the cooperating notches in the hollow cylinder. After use, the injector may be removed from drywall for reuse by the same means operated in reverse.

4 Claims, 2 Drawing Sheets

REUSABLE AIR INJECTOR FOR DRYWALL

BACKGROUND OF THE INVENTION

Field of the Invention

This invention relates to tools used for drying wet drywall and insulation. More specifically, this invention relates to an article of manufacture used to penetrate drywall and provide a path for compressed air applied for desiccation.

Description of the Related Art

Drywall is a familiar construction material used principally for interior walls of structures. Commonly, drywall sheets are nailed between construction framing to form surfaces for interior walls. When thermal insulation of a wall is required, insulating material such as fiberglass or foam insulation is typically placed behind the drywall. While drywall sheets are relatively sturdy, when they become wet they can lose structural integrity, becoming soft and weak. Further, moisture incursion into insulation behind drywall can lead to molding and rot with attendant health and aesthetic degradation.

Drywall can become wet due to exposure to water on its interior-facing surface, as is the case, for example, in house flooding. Alternatively, water pipes interior to walls may develop leaks, as when, for example, a pipe bursts from freezing. In any case, when drywall and insulation become wet, it is imperative to dry them as quickly as possible, to mitigate the risks of structural degradation, molding and rot.

Frequently, when structural drywall has become wet and has remained so long enough that it has lost all structural integrity, it must simply be removed and replaced along with any wet insulation behind it. This measure is expensive, typically requiring not only the application of new drywall and insulation but also the replastering of the entire wall or ceiling when the wet section of drywall has been replaced. Often, though, the degree to which the drywall is wet and structurally weakened is only moderate so that it is possible to save the drywall and insulation behind it by employing measures to desiccate the moisture with the drywall in place.

Prior art teaches several approaches to drying wet drywall. If it is only the room-facing side of the drywall that has become wet, a portable floor fan is used to direct air at the wet spot of the drywall. This approach can be effective when the incursion of moisture into the drywall is relatively superficial and is enhanced when a desiccation system is further employed. However, if substantial moisture incursion has occurred, and especially if insulation behind the drywall has become moist, this method is ineffective to mitigate the moisture damage.

Another approach cuts the bottom 2 to 18 inches from the drywall sheet and removes any moist insulation through the resulting gap (a "flood cut"). The opened drywall is then allowed to dry out simply by virtue of the ambient air circulating through the gap at the bottom of the sheet, perhaps augmented by air circulated by a nearby portable floor fan, ideally aided by a desiccation system. This approach, however, has clear shortcomings. Drying is slow, particularly in high humidity environments. When drying is complete, new insulation must be inserted to replace the damp insulation that was removed. Further, the flood cut needs to be patched to restore the aesthetic integrity of the affected wall.

Yet another approach is to drill small pilot holes at regular intervals in the wet section of the drywall and to insert air injectors through the holes. The air injectors are simply conduits through which pressurized air is directed to flow into the affected area behind the drywall and effect desiccation. In this approach, for vertical walls a horizontal series of holes are punched or drilled, typically at 6 inch to 12 inch intervals, just above the sill plate. In the prior art, disposable air injectors, which are just rigid plastic tubing with perhaps nippling at one end, are inserted into the holes in the drywall to protrude to the interior of the wall. The air injectors are then connected by flexible tubing to a manifold through which pressurized air is provided and conveyed through the tubing and injectors into the interior of the wall. This approach is often effective in drying out both drywall and insulation. It has advantages over the other methods in that both drywall and insulation are left intact. In this prior art, the injectors are disposable. When desiccation is complete, the injectors are simply removed and discarded or alternatively forced into the drywall interior and the holes in which they were inserted are patched.

The prior art injector approach, however, has its limitations. First, injectors are disposable. New injectors must be purchased for each new job. Second, the injectors are typically made of plastic and may break during insertion. Third, use of this approach requires making holes in the drywall with an awl or drill before the injectors can be inserted. What is needed is an injector that can be used in air drying wet drywall and insulation without these limitations.

SUMMARY OF THE INVENTION

A reusable injector to provide pressurized air for drying wet drywall is fashioned to be inserted directly into drywall using a tool such as a motorized screwdriver or drill without requiring a pilot hole.

The injector is an integrated article of manufacture, formed of durable, rigid material such as cast, forged or billet aluminum or polyester resin. A pointed tip for the rotary piercing of drywall protrudes from a supporting frame connected to a hollow cylinder section about which is a helical blade. Further from the tip in some embodiments is a flange, followed by a hex section, hollow inside, from which extends a hollow nipple. In some embodiments, interior to the hollow cylinder section, are notches adapted to receive a Phillips head screwdriver inserted from the nipple end of the injector. The hollow nipple, hex section and cylinder connect to make a pathway for injected air.

To use the injector, the injector is positioned against the drywall with the pointed tip at the desired point of insertion. In some applications, a deep well hex socket sized to engage the hex section of the injector is affixed to an electric drill. The injector's hex section is engaged, the drill is activated to rotate and the pointed tip drills into the drywall with little force required for penetration. When the injector has penetrated sufficiently for the helical blade to engage the drywall, the injector is drawn into the drywall and retained firmly by the engagement of the helical blade with the drywall, leaving the hex section and nipple protruding from the wall. In embodiments with a flange, the flange further retains the hex section and nipple exterior to the drywall.

When embodiments have notches for a Phillips head screwdriver within the hollow cylinder section, an alternative method of injector insertion may be used. A Phillips head screwdriver drill bit of sufficient length to extend through the hollow nipple and engage the Phillips head notches in the injector cylinder is used with an electric drill or screwdriver to drive the injector in a manner analogous to that described in respect to the use of a deep well socket above.

In any case, after the injector has been inserted and has self-retained, flexible hose may be attached to the protruding nipple and pressurized air provided to the affected interior of the drywall in the conventional manner known to those of skill in the art. After the drywall desiccation operation is complete, the injectors can be removed by using the same tools by which the injectors were applied, with direction of rotation reversed. The injector may then be reused in another drywall desiccation operation.

BRIEF DESCRIPTION OF THE DRAWINGS

Objects of the present invention as well as advantages, features and characteristics, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

Figure 1:
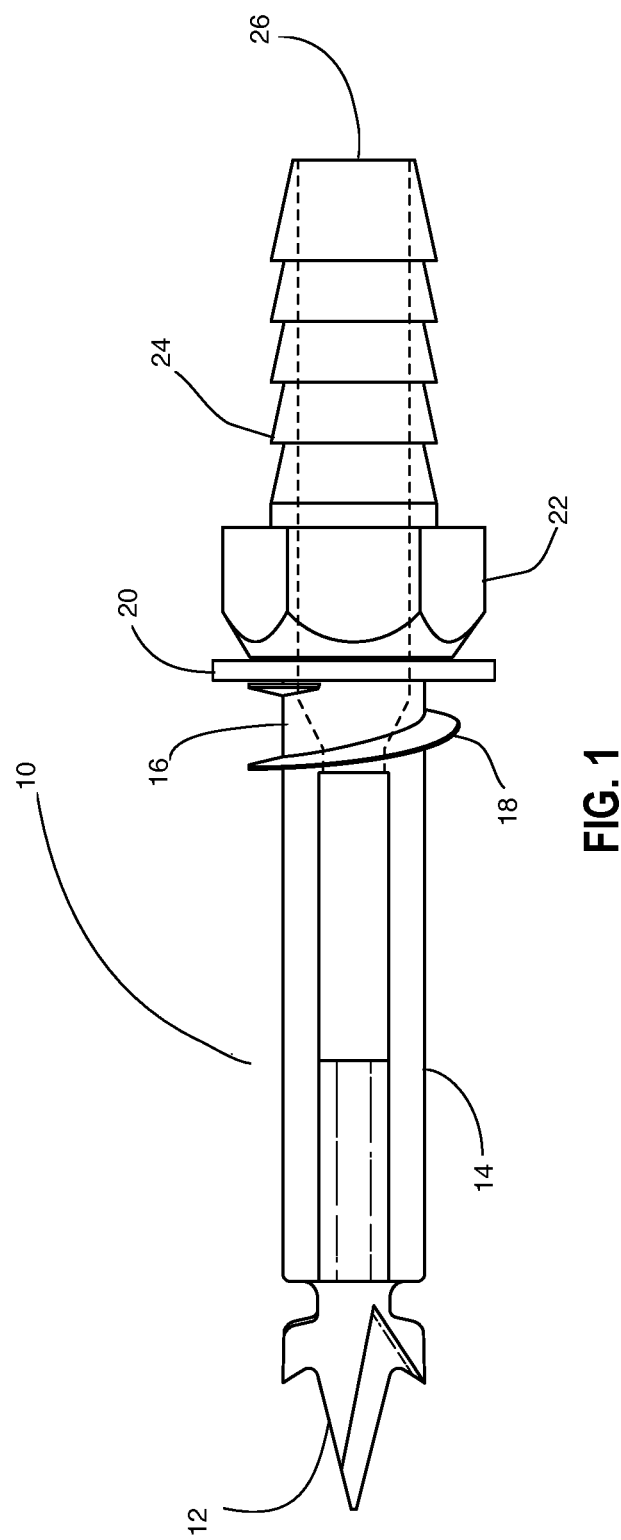
FIG. 1. is a side view of an embodiment of the injector, with dotted lines indicating the hollow interior of the nipple, the hex section and the cylinder section.

Turning now to the drawings, FIG. 1 depicts a side view of an embodiment of the invention. Injector 10 comprises pointed tip 12 extending from supporting frame 14 connecting to hollow cylinder 16 disposed about which is helical blade 18. In the depicted embodiment, flange 20 is interposed between hollow cylinder 16 and hex section 22. In preferred embodiments, hex section 22 is dimensioned to correspond to commonly available deep well hex wrench sockets, such as 13 or 15 mm, or ½ to ⁹⁄₁₆ inch sockets.

Hollow nipple 24 extends from hex section 22. In preferred embodiments, hollow nipple 24 is of a dimension that accommodates the flexible tubing commonly used in drywall desiccation operations, typically ⅜ inch hose. Hollow nipple 24, hex section 22 and hollow cylinder 16 are interconnected to make a pathway 26 for compressed air.

Figure 2:
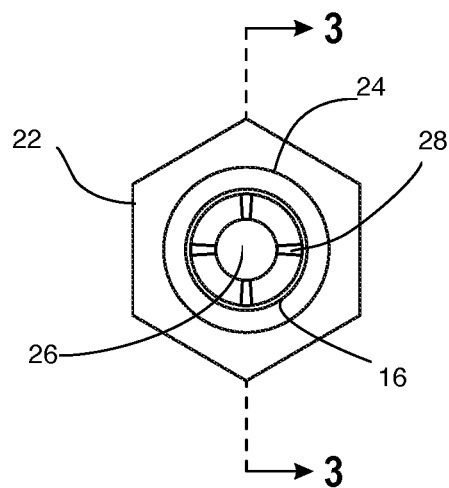
FIG. 2 is a top view of an embodiment of the injector, looking through the hollow interior of the nipple to reveal four notches in the interior of the cylinder section for engaging a Phillips head screwdriver. The plane on which a sectional view in FIG. 3 is taken is indicated by a broken line on FIG. 2. The ends of the broken line are designated with a "3" corresponding to the sectional view in FIG. 3, having arrows indicating the direction of sight in FIG. 3.

FIG. 2 is a top view of an embodiment of injector 10, viewed through the hollow interior of nipple 24 which extends from hex section 22, in which are shown four notches for a Phillips head screwdriver in the interior of hollow cylinder 16, notch 28 labeled, and also showing pathway 26 continuing through hollow cylinder 16.

Figure 3:
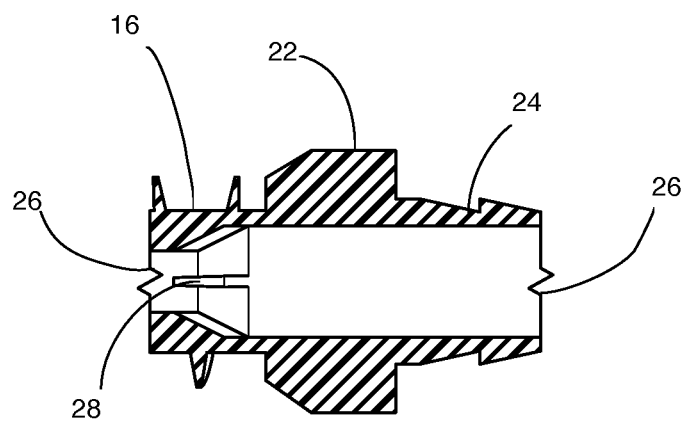
FIG. 3 is a side view cross section of a portion of the injector, comprising a portion of the nipple, the hex section and the cylinder section, showing the notches indicated in FIG. 2.

FIG. 3 is a side view cross section of a portion of the injector, in this embodiment without flange 20, comprising a portion of nipple 24, along with hex section 22 and hollow cylinder 16. A notch 28, one of four notches for engaging a Phillips head screwdriver, is shown within the interior of hollow cylinder 16. Pathway 26 continues from nipple 24 through hex section 22 and hollow cylinder 16.

Persons of skill in the art will readily acknowledge other variations of elements that are still consonant with the teachings of the present invention. For example, instead of an integral flange 20, the injector may be provided without a flange and the user may instead supply a suitably dimensioned washer to provide the same function. Alternatively, the drywall-facing end of hex section 22 can be fashioned to be sufficiently broad and flat that no additional flange or washer is needed.

Further, while a particular relative dimension for supporting frame 14 and hollow cylinder 16 are depicted, it will be apparent to those in the art that all that is required for effective operation is for pathway 26 to communicate compressed air from the exterior to the interior of the affected drywall. Indeed, it will be recognized that cylinder 16 need not extend all the way through to the interior of the drywall, so long as point 12 and supporting frame 14 have made a hole completely through the drywall through which compressed air may travel from pathway 26 in hollow cylinder 16 into the interior side of the drywall. Accordingly, while still keeping with the teachings of the invention, supporting frame 14 as well as hollow cylinder 16 may be considerably shorter or longer than shown in the depicted embodiments, so long as there is sufficient helical blade 18 to securely engage the drywall.

Yet further, while the use of a Phillips head screwdriver has been described in respect to some embodiments of the invention, persons in the art will recognize that the technology of this invention may be adapted to other driver heads such as hex keys (for example the Allen® wrench manufactured by Apex Tool Group, L.L.C. of Huntersville, N.C.) or hexalobular screwdrivers (such as Torx® manufactured by Textron, Inc. of Providence, R.I.), by fashioning the interior of hollow cylinder 16 to receive such driver heads.

In terms of use of the injector, while the specification above has described driving the injector into drywall with power tools such as an electric screw driver or drill, it will be appreciated that the device may be applied with manual tools as well. A manual rachet wrench can be used with a deep well socket. For those embodiments with notches to receive a driver such as a Phillips head in hollow cylinder 16, a rachet or manual screwdriver may be used to drive the injector into the drywall.

While the invention has been described with a certain degree of particularity, it should be recognized that elements thereof may be altered by persons skilled in the art without departing from the spirit and scope of the invention. Accordingly, the present invention is not intended to be limited to the specific forms set forth in this specification, but on the contrary, it is intended to cover such alternatives, modifications and equivalents as can be reasonably included within the scope of the invention. The invention is limited only by the following claims and their equivalents.

I claim:

1. A reusable air injector for drywall, comprising
a bladed, pointed tip connected to a hollow cylinder section,
a helical blade encircling the hollow cylinder section,
a hollow hex section integral to the hollow cylinder section, and
a hollow nipple connected to the hollow hex section,
whereby a pathway for injected air is formed through the hollow nipple and the hollow hex section and the hollow cylinder section.

2. A reusable air injector according to claim 1, wherein the hex section further comprises an integral flange facing the hollow cylinder section.

3. A reusable air injector according to claim 1, wherein the hollow cylinder section further comprises internal notches fashioned to receive a driver head.

4. A reusable air injector according to claim 3, wherein the internal notches are fashioned to receive a driver head selected from the group consisting of a Phillips head, a hex key, and a hexalobular head.

\* \* \* \* \*